United States Patent [19]
Hwang

[11] Patent Number: 5,459,773
[45] Date of Patent: Oct. 17, 1995

[54] AUTOMATIC PAGER CALLING DEVICE

[76] Inventor: Hong S. Hwang, 201 Ho, Na-dong, Sujeong Villa, 47-18 Samseong-dong, Kangham-ku, Seoul, Rep. of Korea

[21] Appl. No.: 246,205

[22] Filed: May 19, 1994

[30] Foreign Application Priority Data

May 20, 1993 [KR] Rep. of Korea .................. 8631/1993

[51] Int. Cl.⁶ .................................................. H04M 11/00
[52] U.S. Cl. .................................................. 379/57; 379/56
[58] Field of Search ................................. 379/56, 57, 67, 379/88, 201, 210, 211, 212

[56] References Cited

U.S. PATENT DOCUMENTS

| | | | |
|---|---|---|---|
| 4,737,979 | 4/1988 | Hashimoto | 379/57 X |
| 4,961,216 | 10/1990 | Baehr et al. | 379/57 |
| 5,128,980 | 7/1992 | Choi | 379/56 |

Primary Examiner—Curtis Kuntz
Assistant Examiner—G. J. Oehling
Attorney, Agent, or Firm—Lowe, Price, LeBlanc & Becker

[57] ABSTRACT

An automatic pager responds to a caller to input the caller's identification code and transmit a received identification code to an absent subscriber possessing the pager. The device includes: a sensor for ringing signals on public telephone lines; an audio frequency detector for dial tones, busy tones, click tones and acceptance signals from public telephone lines: a DTMF generator responds to a stored subscription number signal and transmits it via public telephone lines; a DTMF receiver responds to a DTMF signal from public telephone lines to generate the called subscription number; an audio synthesizer generates a message indicating the subscriber's absence, which message requests the caller's identification code and is transmitted through public telephone lines; a hybrid circuit matches public telephone lines with the DTMF generator, DTMF receiver, audio frequency sensor, and audio synthesizer; a relay selectively connects public telephone lines with the ringing signal sensor and hybrid circuit; a keyboard derives the subscriber's pager subscription number, the caller's ID code, subscription number and serial number; a CPU: (1) inputs the subscriber's subscription number, (2) responds to a caller during the subscriber's absence by sending a message indicating the subscriber's absence and requesting the caller to input his ID or telephone number, (3) re-forms a communicating loop when the caller's ID or telephone number is received. (4) transmits the subscriber's pager subscription number and received caller's ID or telephone number and serial number to apprise the subscriber of a call during his absence.

4 Claims, 4 Drawing Sheets

AUTOMATIC PAGER CALLING DEVICE

FIELD OF THE INVENTION

The present invention relates to an automatic pager calling device intended to respond automatically for an absent telephone subscriber to the call from an indefinite caller, and more particularly to an automatic pager calling device which receives a call from another subscriber, stores the subidentification code on a recording medium, and relays it to the absent subscriber via a receiver of the device.

BACKGROUND OF THE INVENTION

When a telephone subscriber who possesses a prior art automatic telephone responder, i.e., answering machine, is absent from the responder at the time a call is coupled to the pager from another subscriber, the responder transmits an audio message indicating the absence of the called subscriber and stores the caller's message on a recording device. This sort of ordinary automatic responder regenerates the caller message stored on a built-in storing device when the called subscriber returns to his home and operates the responder or regenerates and transmits to the called subscriber through a public phone network when the called subscriber requests regeneration of the message through the public phone network. Despite these conveniences, this type of prior art automatic responder possesses no means of relaying received message for the absent subscriber. Therefore the prior art responders frequently require the absent subscriber to call or operate the responder to see if he has had a call in his absence, and, in a worst case scenario, is unable to relay a message at the right time.

In contrast, a pager receiver can emit a calling signal for the absentee and indicate the caller's identification code (e.g. his phone number) in response to reception of a radio frequency signal including the pager receiver assigned address from a local paging station. This type of pager receiver is usually favored by people whose whereabouts cannot be easily determined and a caller should in this case know the pager subscription numbers of the called person. Most users of pager receivers have pager subscription numbers and ordinary telephone numbers; however, when a caller calls a subscriber with his ordinary telephone number, usually there is no way for a subscriber to identify the caller at the right time.

SUMMARY OF THE INVENTION

The present invention is intended to provide an automatic pager calling device which can lead a caller to input his message to obtain his identification code and immediately call the pager receiver to apprise him of the just received information.

With a view to attaining this object, the automatic pager calling device of the present invention is arranged so:

a ringing signal sensing means senses a ringing signal from public telephone lines;

an audio frequency signal detecting means detects a dial tone, busy tone, click tone, and acceptance tone from the public telephone lines;

a DTMF signal generating means generates a first DTMF signal including the subscriber's subscription number and transmitting the first DTMF signal-to the public telephone lines;

a DTMF signal receiving means receives and reads a second DTMF signal from the public telephone lines and generates a subscription number received from the caller;

an audio synthesizing means generates a message indicating the subscriber is absent and a message requesting input of the subscription number of the caller, and transmits the messages to the public telephone lines;

a matching means matches the public telephone lines with the DTMF signal generating means, the DTMF signal receiving means, the audio frequency signal detecting means, and the audio synthesizing means enables: (1) an output of the DTMF signal generating means and the audio synthesizing means to be transmitted to the public telephone lines without substantial attenuation or distortion, and (2) steady receipt of the DTMF signals and audio frequency signals from the public telephone lines by the DTMF signal receiving means and audio frequency sensor;

a switching means selectively connects and disconnects the public telephone lines with said ringing signal sensor and said matching means;

a key inputting means derives the subscriber's subscription number;

a memory stores the subscriber's subscription number and the caller's identification code or subscription number and the serial number and;

a control means stores in the memory the subscriber's pager subscription number derived by the key inputting means and controls the audio frequency signal detecting means, the switching means, the audio synthesizing means, the matching means, the DTMF signal generating means, the DTMF signal receiving means and the memory;

the control means controls the switching means and audio synthesizing means in response to a ringing signal being detected by the ringing signal sensor so the public telephone lines are coupled to the matching means for enabling the subscriber's subscription number to be transmitted through said public telephone lines; the control means (a) receives and stores in the memory the caller's subscription number received by the DTMF signal receiving means; (b) activates the switch means to selectively couple and decouple the public-telephone lines with the matching means; and (c) supplies the subscriber's pager subscription number and the received caller's subscription number and serial number stored in the memory to the DTMF signal generating means thereby to activate the DTMF signal generating means so it transmits the DTMF signal indicative of the pager subscription number and the caller's subscription number to the matching means in accordance with a signal indicative of the state of communication lines as derived from the audio frequency signal detecting means to call the subscriber's receiver and send the caller's subscription number.

IN THE DRAWINGS

FIG. 1 is a block diagram of the automatic pager calling device according to a preferred embodiment of the present invention; and FIGS. 2(A) to 2(C) form a flow chart of operations performed by the automatic pager calling device of FIG. 1.

DETAILED DESCRIPTION OF THE PREFERRED EMBODIMENT

Figure 1:
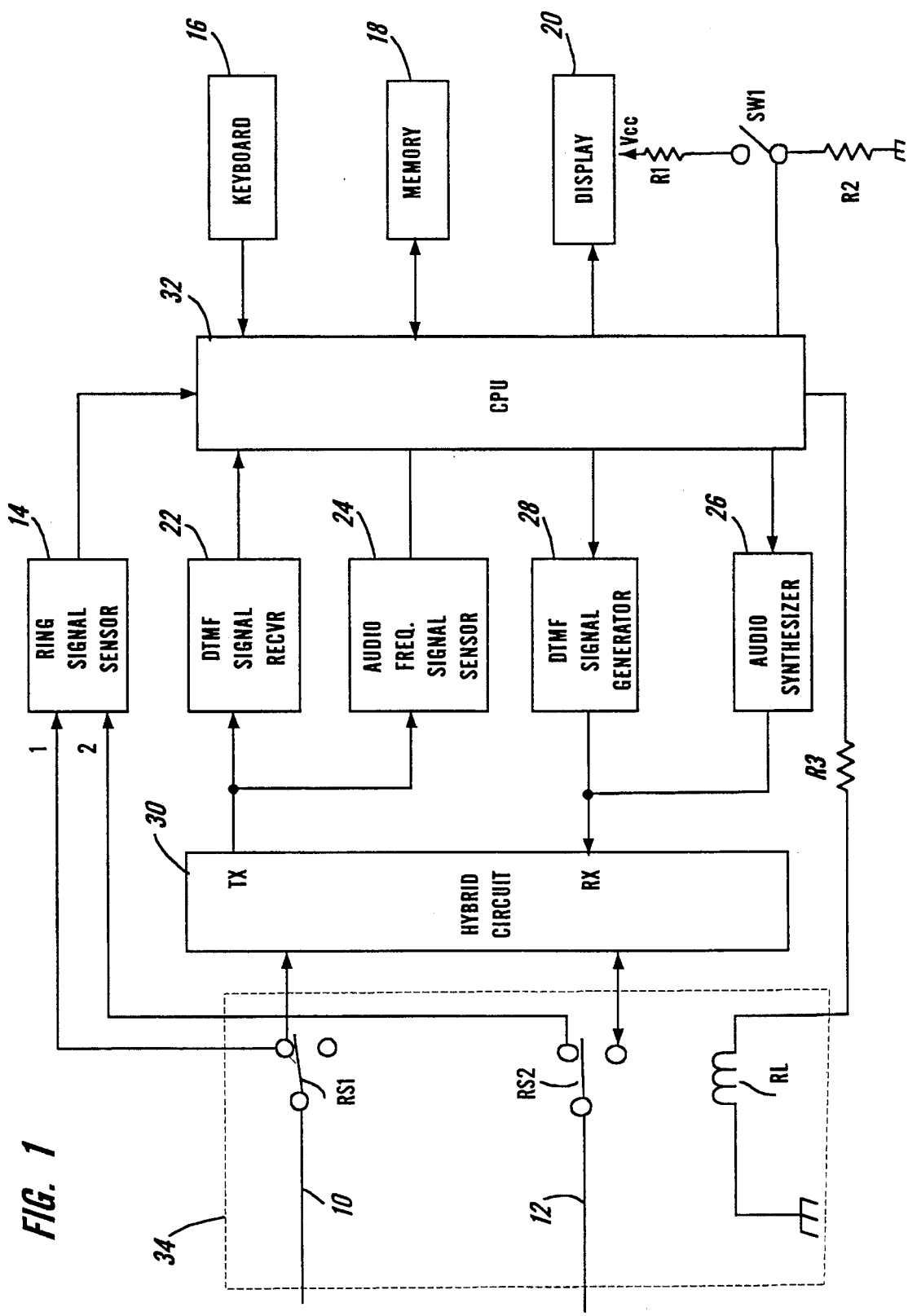

As shown in FIG. 1 the automatic pager calling device of a preferred embodiment of the present invention includes an on and off switching relay 34 for selectively coupling first and second public telephone lines 10, 12 with a ringing signal sensor 14 and hybrid circuit 30 so the sensor and hybrid are connected to or disconnected from the lines. Relay 34 has a magnetizing coil RL that is switched on and off to respectively connect and disconnect first and second contact switches (RS1, RS2), with the first and second public telephone lines 10, 12. Magnetizing coil RL generates an electromagnetic force when a high logic state signal is derived from central processing unit CPU and coupled through resistor R3, to connect first and second terminals of hybrid circuit 30 with lines 10 and 12. When a low logic state signal is applied by CPU to magnetizing coil RL, contact switches RS1, RS2 are respectively switched to input terminals 1 and 2 of ringing signal sensor 14 so public telephone lines 10, 12 are connected to ringing signal sensor 14. Ringing signal sensor 14 generates and supplies to CPU 32 a high logic state signal when a ringing signal from public telephone lines 10, 12 is coupled through relay 34. Hybrid circuit 30 receives audio frequency signals, dial tone and multi-frequency (DTMF) signals from public telephone lines 10, 12 through relay 34 and supplies these signals via its output to DTMF signal receiver 22 and audio frequency signal sensor 24. Hybrid circuit 30 responds to DTMF signals and audio messages respectively supplied to its receiving terminal RX by DTMF signal generator 28 and audio synthesizer; circuit 30 couples these signals and messages to public telephone lines 10, 12 through relay 34. When a DTMF signal is derived from transmitting terminal TX of hybrid circuit 30, DTMF signal receiver 22 decodes it, generates the dialing information generated by the caller, and provides the generated dialing information to CPU 32. The dialing information includes the caller identification code, the caller telephone number and serial number inputted in sequence during the called subscriber's absence, and a control command for a re-transmission which the subscriber has previously supplied to the pager of FIG. 1. Audio frequency signal sensor 24 generates an audio frequency signal detecting signal which has a high logic state when an audio frequency signal is supplied to it by transmitting terminal TX of hybrid circuit 30; sensor 24 derives a low logic state when no audio frequency signal is supplied to it via terminal TX. The logic state output signal of sensor 24, indicative of the presence and absence of an audio signal at terminal TX, is supplied to CPU 32.

In the preferred embodiment of the automatic pager calling device of the present invention, keyboard 1, which supplies the subscriber's pager subscription number to CPU 32, has a pager input mode selection switch SW1 for setting the input mode of the subscriber's pager subscription number and a read only memory (ROM) 18 for storing the subscriber's pager subscription number, the identification code or the telephone number of the caller and the serial number. Pager input mode selection switch SW1 is connected to DC power supply Vcc and ground potential (GND) via resistors R1 and R2. Switch SW1 is closed to input a pager subscription number. Switch SW1 is turned on, i.e. closed, by the subscriber to generate a pager input mode setting signal having a high logic state. When the subscription number derived by the subscriber with the use of key-board 16 is different from the pager subscription number, or when the subscriber's pager subscription number is not stored in memory 18 at the time the power is on, display 20, connected to CPU 32, responds to an output of CPU 32 to indicate the error, and display the messages and serial numbers for retrieval of data stored in memory 18.

While pager input mode selection switch SW1 is closed and the pager input mode setting signal is in the high logic state, CPU 32 receives the pager subscription number derived by the subscriber activating keyboard 16, causing the subscription number to be stored in memory 18. Each time a sensed ringing signal is derived from ringing signal sensor 14 while pager input mode selecting switch SW1 is closed, CPU 32 controls (1) relay 34 to form a communicating loop and (2) audio synthesizer 26 to cause the synthesizer to transmit (a) a message indicating the subscriber is absent, (b) a message requesting the caller's identification code be supplied to the apparatus of FIG. 1 and (c) the telephone number to public telephone lines 10, 12 through hybrid circuit 30 and relay 34. At this time CPU 32 also receives the caller's identification code or the telephone number and the serial number coupled through hybrid circuit 30 and DTMF receiver 22 to store them in memory 18. CPU 32 also drives relay 34 to lockout and reform a communicating loop and activates DTMF signal generator 28 to generate the subscriber's pager subscription number. Thereby, DTMF signal generator 28 transmits the DTMF signal corresponding to the pager subscription number of the caller when a dialing tone is confirmed by an audio frequency detecting signal from audio frequency sensor 24. CPU 32 sends the caller's identification code or telephone number and the serial number to DTMF signal generator 28 so that said DTMF signal generator 28 generates DTMF signals relative to the caller's identification code or his telephone number and the serial number which it has received from CPU 32. Generator 28 transmits these generated data signals to public telephone lines 10, 12 via hybrid circuit. 30 when audio frequency signal sensor 24 responds to an input thereof that an audio frequency detecting signal has been received.

Figure 2A:
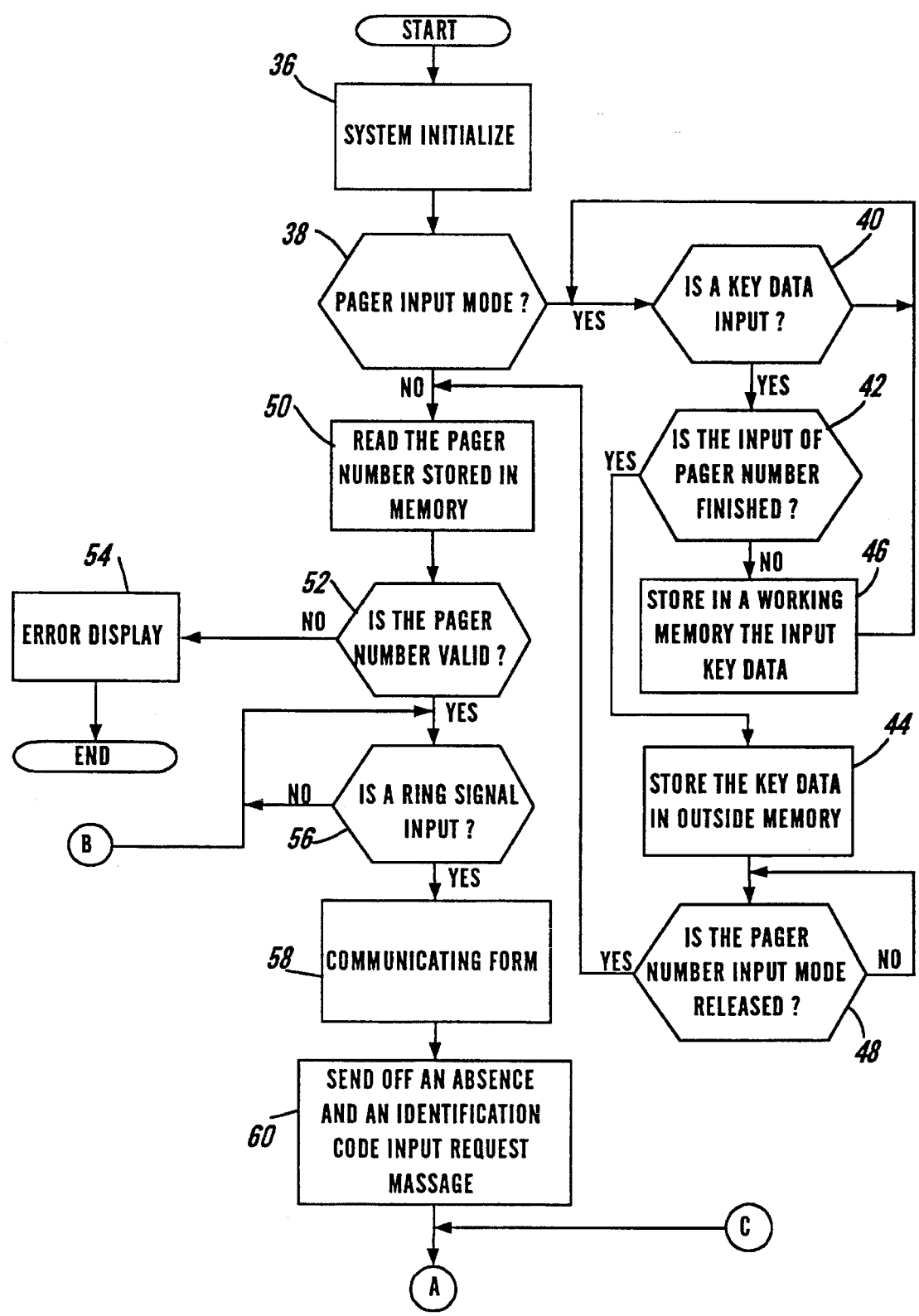
Figure 2B:
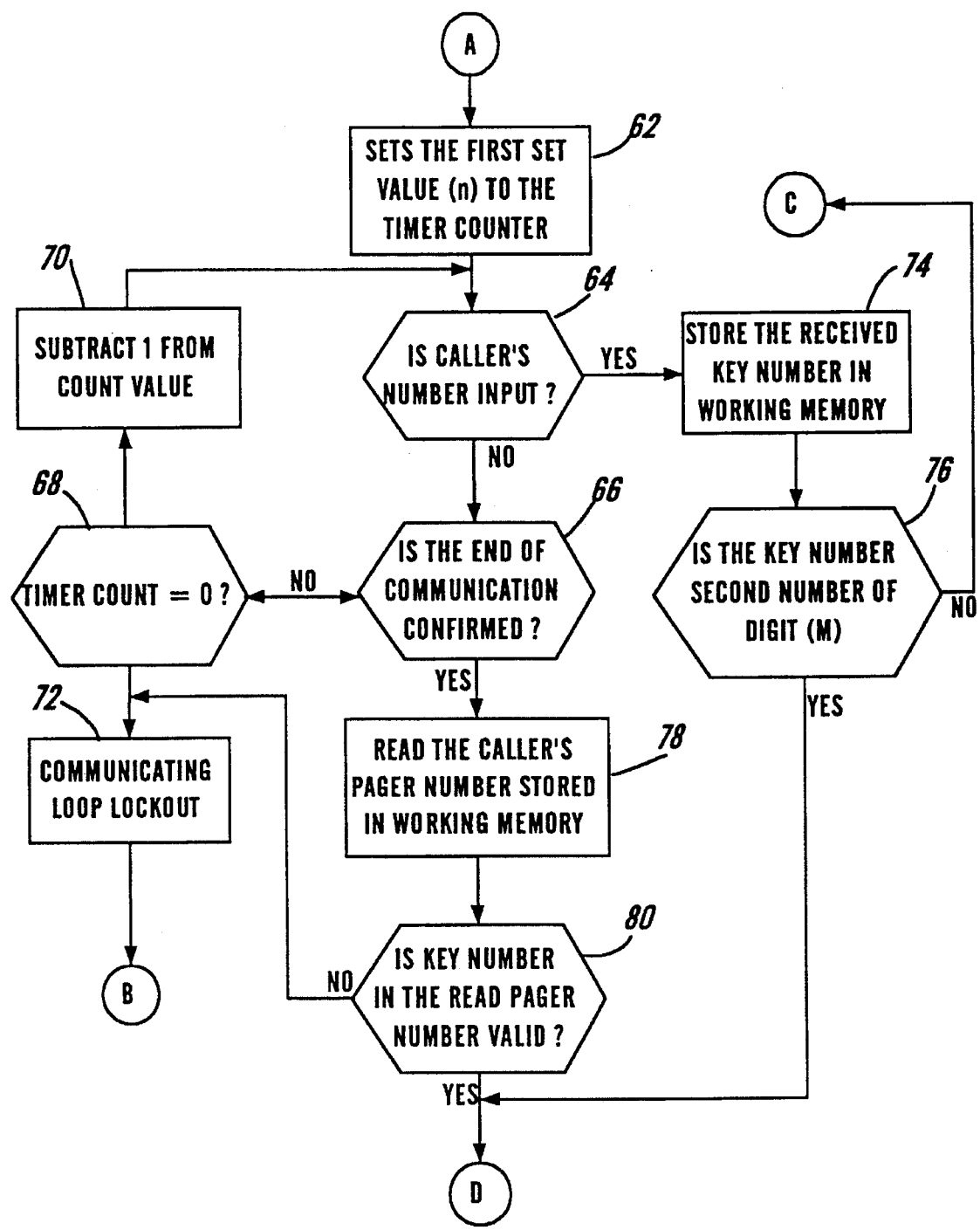

FIGS. 2 (A) to 2 (C) together constitute a flow chart of details of the method for calling the automatic pager calling device shown in FIG. 1. The operation of the device shown in FIG. 1 is carried out by CPU 32, FIG. 1, while power is supplied to the CPU and other components of FIG. 1.

When power is turned on, CPU 32 enters step 36 and initializes several of the CPU components, namely its timer-counter, a counter for serial numbers, various buffer registers, and the random access memory (RAM). In addition, CPU 32 initializes the caller's pre-received identification code and telephone number previously stored in memory 18, but does not initialize the pager subscriber's subscription number.

Then during step 38, CPU 32 checks the condition of pager mode input selection switch SW, to determine if it is in the pager input mode.

If the pager input mode selection switch SW1 is found to be closed during step 38 and a pager input mode selection signal has a high logic state, i.e. the pager input mode is set, CPU 32 advances to step 40 where it remains until key data are derived from keyboard 16.

When step 40 determines key data are derived, CPU 32 advances to step 42 to check if the sharp (#) key has been included in the derived key data; the sharp key indicates all characters in the pager subscriber's subscription number have been entered in keyboard 16.

In case the sharp key is not included in the key data derived from keyboard 16, CPU 32 advances to step 46 to store the input key data in its own working memory and then returns to step 40.

On the other hand, if the sharp key is included in the input key data, CPU 32 advances to step 44 to indicate that all characters of the caller's pager subscription number have been applied to keyboard 16, whereupon the CPU stores the caller's pager subscription number in an outside memory.

CPU 32 then advances to step 48 where it waits until pager input mode selection switch SW1 is turned off and the pager input mode is released.

If, during steps 38 and 48, the pager input mode selection switch SW1 is detected as being turned off or the pager input mode is detected as being released, CPU 32 advances to step 50 to read the caller's pager subscription number stored in ROM 18. CPU 32 then advances to step 52 to check if there are ten integers in the read pager subscription number and determines whether the caller's pager subscription number or the pager subscription number derived by the caller is a valid pager subscription number.

If the subscription number derived by the subscriber is determined during step 52 to be an invalid subscription number, viz. in case the number read from ROM 18 turns out to have other than 10 digits, CPU 32 advances to step 54 to cause display 20 to transmit visually to the caller an error message showing that either the input subscription number is not the pager subscription number or that there is no pager subscription number being inputted. The number of pager subscription numbers can be increased as the number of callers increases. If the caller's pager subscription number stored in ROM 18 is detected during step 52 as being correct, CPU 32 advances to step 56 where it stays until the CPU is supplied with a ringing sensing signal by ringing signal sensor 14.

In response to a ring signal being detected by CPU 32 during step 56, the CPU advances to step 58 to supply magnetizing coil RL of relay 34 with a high logic state communicating loop control signal via resistor R3. At this time magnetic coil RL of relay 34 forms a communicating loop in response to a loop control signal derived from CPU 32 having a high logic state, causing contact switches RS1, RS2, respectively connected to public telephone lines 10, 12, to connect the public telephone lines to terminals 1 and 2 of hybrid circuit 30.

After CPU 32 executes step 58, it advances to step 60 to activate audio synthesizer 26 to transmit a message indicating that the subscriber is absent and an information request message requesting the caller to input his caller identification code or telephone number and the serial number for the absent subscriber.

Then audio synthesizer 26, under the control of CPU 32, transmits a synthesized message in digital data form from its memory to public telephone lines 10, 12 via contact switches RS1, RS2 of hybrid circuit 30 and relay 34. After step 60, CPU 32 advances to step 62 (FIG. 2(B)), to set the first set value (n) in the timer-counter register in the CPU assigned to this purpose, thereby setting a time to wait for receipt of a caller's identification code or telephone number of one digit. The first set value (n) is selected to secure a few seconds or scores of seconds for the input. After step 62, CPU 32 advances to step 64 to check if a caller's digital key number is being supplied to the CPU by DTMF receiver 22.

If no digital key number is detected during step 64, CPU 32 advances to step 66 to check whether a high logic state audio frequency detecting signal is supplied to the CPU by audio frequency signal sensor 24 and the length of time a logic signal is in a high logic state, to thereby determine whether a busy tone or click tone is supplied by public telephone lines 10, 12 to hybrid circuit 30; these steps determine if the communication has been completed. If step 66 determines no busy tone or click tone has been received from public telephone lines 10, 12, CPU 32 checks whether the count value on its own timer-counter is "0"; if it is not "0," the count value is decremented by one during step 70 and then the CPU returns to step 64.

Magnetic coil RL of relay 34 responds to the low logic state of the loop control signal derived from CPU 32, to activate first and second contact switches RS1, RS2 to connect public telephone lines 10, 12 to ringing signal sensor 14 to thereby lockout the communicating loop and transfer the communicating stage to a ring waiting state. As a result, CPU 32, in steps 62 to 72, decides that there is no input signal if a busy tone or click tone is not supplied in the allowed time of a few seconds or scores of seconds and proceeds to lockout the communicating loop, transferring it to a state of waiting for a ringing.

On the other hand, if a digital key signal is supplied to CPU 32 by DTMF receiver 22 during step 64, CPU 32 stores the received digital key number in the working memory of CPU 32 during step 74. CPU 32 then, during step 76, determines if the digital key number stored in its working memory is the same as the second number of digits (M), thus finding out if the caller's key inputting has ended. CPU 32 returns to step 62 if the digital key numbers stored in the working memory are determined during step 76 to be less than the second set of digits (M).

Consequently CPU (32) performs steps 62, 64, 74 and 74 in repetition and inputs the second set of digits (M) of digital key numbers. The number of integers in the second set of digits (M) can be set at 18 to cover overseas telephone numbers.

If step 66 determines that a busy tone or a click tone has been received from public telephone lines 10, 12, CPU 32 advances to step 78 to read the caller's identification code or telephone number stored in the working memory. CPU 32 then advances to step 80 to check if there are valid key numbers among the read-out identification code and the telephone numbers, and determines whether the identification code or telephone number and request retrieval have been received.

CPU 32 returns to step 72 if CPU 32 determines during step 80 that there is no received identification code, telephone number, or request for retrieval.

Figure 2C:
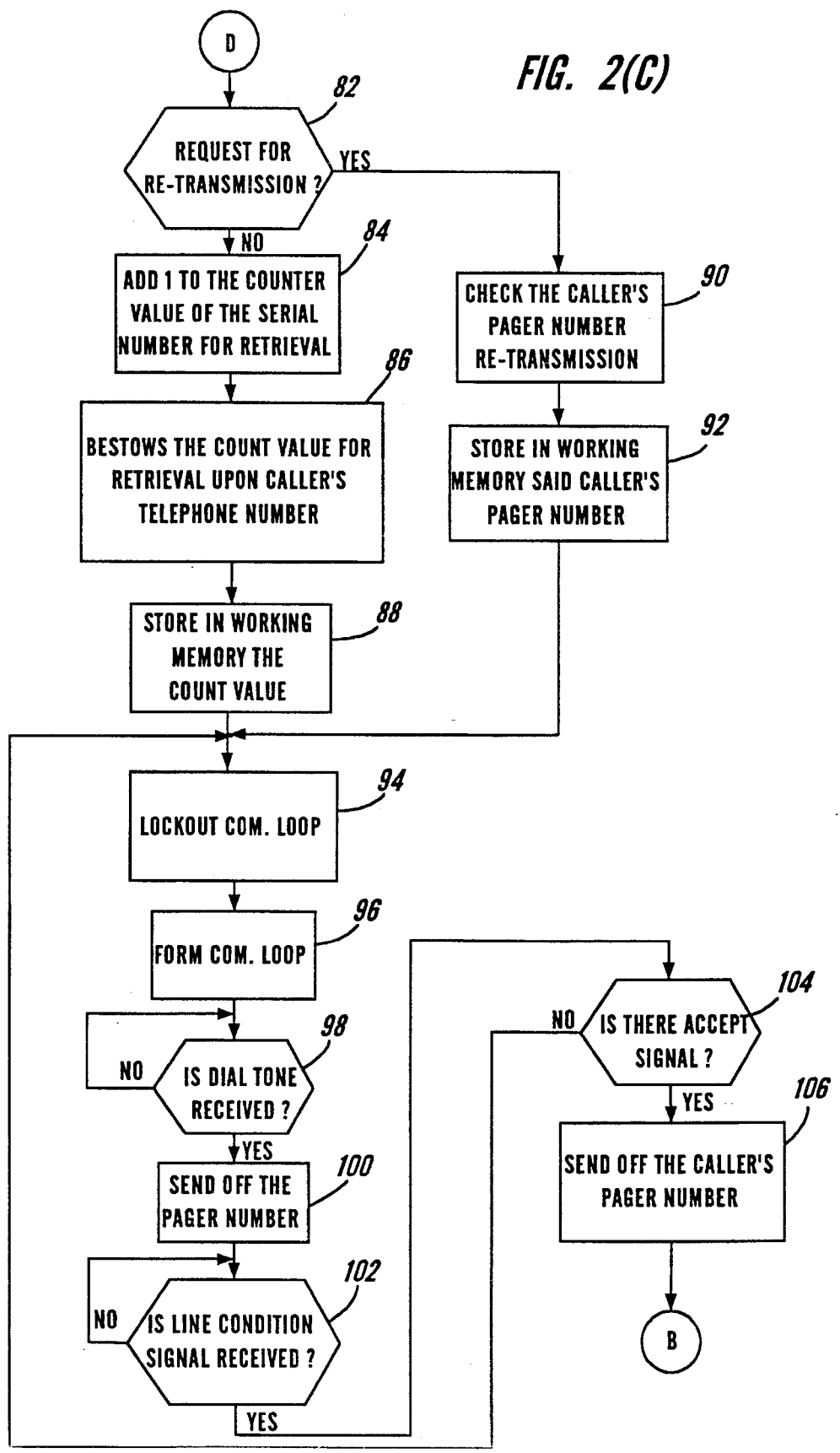

On the other hand, if, in step 80 CPU 32 determines a caller's identification code and telephone number have been received, the CPU 32 advances to step 82 (FIG. 2(C)) to check the first key numbers of the received identification code and telephone number to detect whether the first key numbers are for a retrieval command (asterisk key data, etc.) or, otherwise, and determines if there is a user request for re-transmission.

In case the first key numbers of the caller's identification code and telephone number received are detected during step 82 as not being a retrieval command (asterisk data and the like), i.e. if there is no request for re-transmission, CPU 32 advances to step 84 to add 1 to the count value of the serial number for retrieval in the CPU; CPU 32 then advances to step 86 to bestow the counted count value of the serial number for retrieval on the received caller's identification code or telephone number.

After step 86 CPU 32 advances to step 88 to store the caller's identification code or telephone number thus bestowed with a serial number for retrieval in the CPU working memory.

On the other hand, if the first key numbers of the caller's identification code and telephone number are determined during step 82 to be a number for retrieval (asterisk data and the like), viz. if they are a command for re-transmission from the subscriber, CPU 32 checks with the identification code and telephone number of the caller stored in ROM 18 and proceeds to step 90 to read the previously received caller's identification code and telephone number, bestowed with the serial number, included in the re-transmission command. The CPU 32 advances to step 92 to store the read-out identification code or telephone number and serial number of the caller in its internal working memory.

After performance of steps 88 or 92, CPU 32 advances to step 94 to apply a low logic state loop control signal to magnetizing coil RL of relay 34. This turns off the communicating loop to stop communication since magnetic coil RL switches off first and second contact switches RS1, RS2 so public telephone lines 10, 12 are connected to ring signal sensor 14.

CPU 32 advances to step 96 to again apply a high logic state loop control signal to magnetizing coil RL of relay 34. This returns the pager to the communication state, since the communicating loop is formed by activating magnetizing coil RL of relay 34 so the first and second contact switches RS1, RS2 connect public telephone lines 10, 12 to hybrid circuit 30.

After step 96, CPU 32 advances to step 98 to monitor the logic state of the audio frequency detecting signal derived from audio frequency signal sensor 24 and stays at this step until a dial tone signal is supplied to hybrid circuit 30 by public telephone lines 10, 12.

In response to a dial tone signal being detected during step 98, CPU 32 advances to step 100 to read the subscriber's pager subscription number stored in external ROM 18 and send the read-out pager subscription number of the caller by activating DTMF signal generator 28. DTMF signal generator 28 generates the DTMF signals corresponding to the pager subscription number sensed by CPU 32 and transmits the thus generated DTMF signals to public telephone lines 10, 12 via hybrid circuit 30. After performing step 100, CPU 32 advances to step 102 where it stays until a high logic state audio frequency signal detecting signal is supplied to the CPU by audio frequency signal sensor 24 to indicate public telephone lines 10, 12 are in a condition to receive a signal.

In response to step 102 detecting that a high logic state audio frequency sensing signal is being supplied to CPU 32 by sensor 24, the CPU advances to step 104 to determine if the received signal is an acceptance signal requesting transmission of telephone numbers. Step 104 is performed by detecting how long the high logic state of the audio frequency sensing signal lasts.

If the received signal indicative of the condition of the lines is not an acceptance signal, CPU 32 determines that the received signal is a busy tone, indicating the line is occupied. CPU 32 then leaves step 104 and returns to step 94 to repeat steps 94–104.

On the other hand, if the signal indicative of the condition of the lines, as detected in step 104, is an acceptance signal, CPU 32 advances to step 106 to read its internal memory to DTMF signal generator 28 so generator 28 is loaded in sequence with the caller's identification code or telephone number as well as the serial number. Then DTMF signal generator 28 generates DTMF signals corresponding to the caller's identification code or telephone number and the serial number loaded therein by CPU 32, and transmits these signals to public telephone lines 10, 12. These DTMF signals, corresponding to the caller's identification code or telephone number and the serial number and transmitted to public telephone lines 10, 12 are then transmitted via a regional pager center (not shown) and through the air to the pager receiver carried by the subscriber; characters indicative of these signals are usually displayed at the subscriber's pager receiver so the subscriber can comprehend them.

CPU 32, after performing step 106, applies a low logic state loop control signal to magnetic coil RL of relay 34 so switches RS1, RS2 connect public telephone lines 10, 12 to ringing signal sensor 14 to turn off the communication loop and change the pager so it is in a waiting communication state and can respond to another ringing. CPU 32 then returns to step 56 so the process can be repeated.

As has been described above, the automatic pager calling device of the present invention has several advantages, including, inter alia:

(1) The subscriber's pager subscription number is supplied in advance to the pager. Hence, when one calls in the subscriber's absence, this device responds to the caller and transmits a message indicating the subscriber's absence and requesting the caller's identification code or telephone number; upon receipt of these requested data from the caller, the device transmits to the pager subscriber the caller's identification code or telephone number and the serial number for retrieval, thereby immediately apprising the subscriber of the fact that he has had a call.

(2) Calls the subscriber has been unable to receive because he is in regions where a pager cannot be reached as, for instance, subways, can also be recalled by the subscriber at will. To this end, the subscriber makes a call later for re-transmission of the identification code or telephone number, and the serial number of the earlier caller and is thus accurately apprised of the calls which he has been unable to receive at the time of the original call.

I claim:

1. An automatic pager calling device, comprising;

a ringing signal sensing means for sensing a ringing signal from public telephone lines;

an audio frequency signal detecting means for detecting a dial tone, busy tone, click tone, and acceptance tone from the public telephone lines;

a DTMF signal generating means for generating a first DTMF signal including a subscriber's pager subscription number and transmitting said first DTMF signal to the public telephone lines;

a DTMF signal receiving means for receiving and reading a second DTMF signal from said public telephone lines and generating a subscription number received from a caller;

an audio synthesizing means for generating a message indicating a subscriber is absent and a message requesting input of the subscription number of the caller, and transmitting said messages to the public telephone lines;

a matching means for matching the public telephone lines with said DTMF signal generating means, said DTMF signal receiving means, said audio frequency signal detecting means, and said audio synthesizing means for enabling: (1) an output of said DTMF signal generating means and said audio synthesizing means to be transmitted to said public telephone lines without substantial attenuation or distortion, and (2) steady receipt of said DTMF signals and audio frequency signals from said public telephone lines by said DTMF signal receiving means and audio frequency signal detecting means;

a switching means for selectively connecting and disconnecting said public telephone lines with said ringing signal sensing means and said matching means;

a key inputting means for deriving the subscriber's pager subscription number;

a memory for storing the subscriber's pager subscription number, the caller's identification code or subscription number, and a serial number and;

a control means for storing in said memory the subscriber's pager subscription number derived by said key inputting means and controlling said audio frequency signal detecting means, said switching means, said audio synthesizing means, said matching means, said DTMF signal generating means, said DTMF signal receiving means and said memory, said control means controlling said switching means and said audio synthesizing means in response to a ringing signal being detected by said ringing signal sensing means so said public telephone lines are coupled to said matching means for enabling the subscriber's pager subscription number to be transmitted through said public telephone lines; said control means (a) receiving and storing in said memory the caller's subscription number and the serial number received by said DTMF signal receiving means; (b) activating said switching means to selectively couple and decouple said public telephone lines with said matching means; and (c) supplying the subscriber's pager subscription number and the received caller's subscription number and serial number stored in said memory to said DTMF signal generating means thereby to activate said DTMF signal generating means so it transmits said first DTMF signal indicative of the pager subscription number and the caller's subscription number and the serial number to said matching means in accordance with a signal indicative of the state of communication lines as derived from said audio frequency signal detecting means to call the subscriber's pager and send the caller's subscription number.

2. An automatic pager of claim 1 further including a display means responsive to said control means for indicating the occurrence of an error in response to the pager subscriber's number derived by the subscriber differing from the number for the pager, or no pager subscriber's number being derived or an error in the messages and a serial number stored in said memory.

3. An automatic pager of claim 1 wherein:

said control means includes a central processing device.

4. An automatic pager of claim 3, wherein:

said central processing means associates with serial number the received caller's subscription number to confirm the caller who calls the subscriber during absence of the subscriber by re-transmitting the caller's subscription number, said serial number being included in a re-transmission command from the subscriber in response to the caller's subscription number received through the public telephone lines including an instruction for re-transmission of messages which the subscriber is unable to receive.

* * * * *